April 22, 1969  G. R. BOUWKAMP  3,439,659
SPIRAL METERING VALVE
Filed May 9, 1967
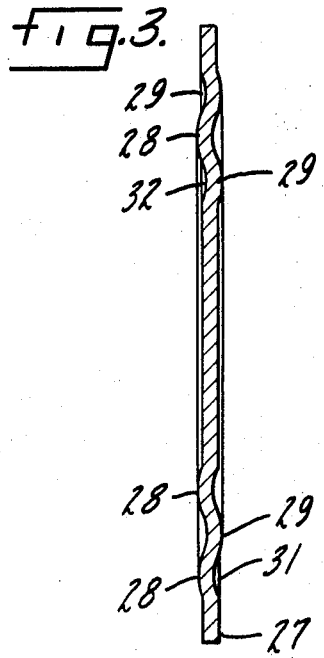
fig.2.
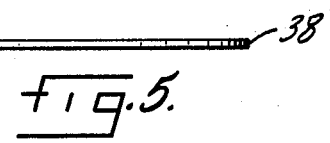
fig.3.
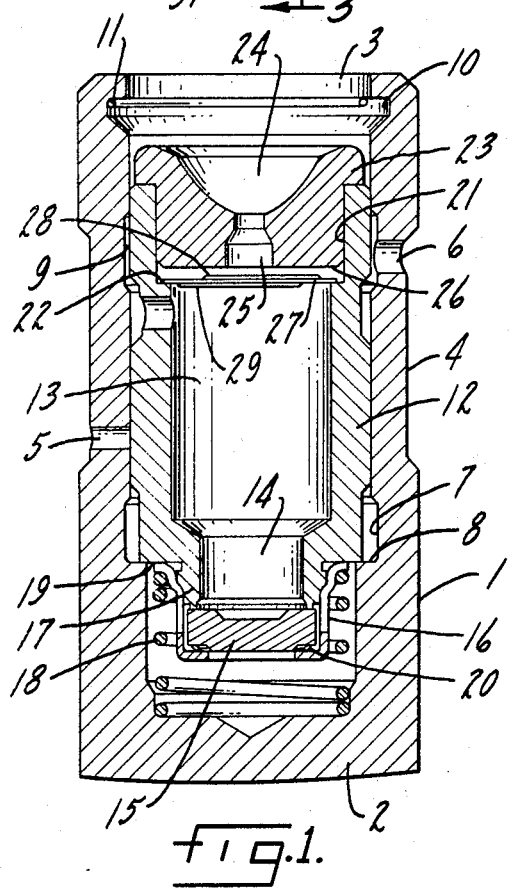
fig.1.
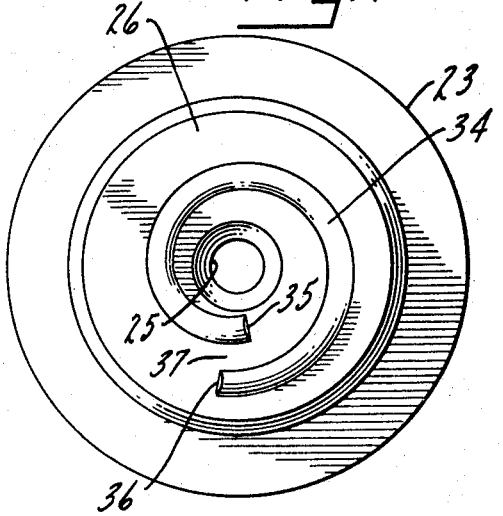
fig.4.
fig.5.
INVENTOR.
Gerald R. Bouwkamp,
BY Parker & Carter
Attorneys.

United States Patent Office 3,439,659
Patented Apr. 22, 1969

3,439,659
SPIRAL METERING VALVE
Gerald R. Bouwkamp, Villa Park, Ill., assignor to Standard Screw Company, Bellwood, Ill., a corporation of New Jersey
Filed May 9, 1967, Ser. No. 637,223
Int. Cl. F01l 1/16
U.S. Cl. 123—90         7 Claims

ABSTRACT OF THE DISCLOSURE

This invention comprises a metering valve for use in a hydraulic tappet or valve lifter. The metering valve is located within the hollow plunger of the hydraulic tappet. There is an opening from the interior of the hollow tappet into the cup in which the end of the hollow pushrod is located. The valve is positioned near this opening and is adapted to be seated against the member in which the opening is located. The valve comprises a generally flat imperforate disk which has formed in each face a generally spiral raised portion. The raised portion of the side of the disk opposite the member in which the opening is formed comprises the sole part of the disk which seats in this direction. The ends of each spiral overlap and are out of contact. The two spirals are provided merely to simplify assembly and to make sure that the disk is assembled in the tappet so that one spiral will always be in position to move to seat. Only one spiral is active at a time and the spiral on the opposite face of the disk is inactive since it is faced in the direction of the interior of the tappet plunger.

---

An object of the invention is to provide a metering disk which may be readily assembled in a tappet plunger and which is so shaped that it cannot be wrongly assembled.

A further object is to provide a metering valve disk of such design that it can be readily and cheaply formed in such shape that it will adequately perform the metering function.

Another object is to provide the necessary seating portions on the valve disk in such shape and disposition that they will distribute the inevitable wear on the valve seat over as wide an area as possible.

The invention is illustrated diagrammatically in the accompanying drawings wherein:

FIGURE 1 is a longitudinal section through a valve tappet in which the metering valve disk may be positioned.

FIGURE 2 is a plan view on an enlarged scale of the metering valve disk.

FIGURE 3 is a transverse section taken at line 3—3 of FIGURE 2.

FIGURE 4 is a plan view of the bottom of the cup illustrating a modified form, and FIGURE 5 is a side elevation of a modified form of disk to be used with the modified cup of FIGURE 4.

Like numerals will be used to designate like parts in the following description of the drawings.

As shown in FIGURE 1, the tappet comprises a cylinder 1 having a closed end 2 and an open end 3. The cylinder may be reduced in its external diameter as at 4. It is provided with oil openings 5 and 6. The cylinder is enlarged internally as at 7 and is provided with a shoulder 8. The cylinder is also enlarged internally as at 9 to provide an annular space with which the passage 6 communicates. The cylinder is provided adjacent its open end with a groove 10, within which a locking or limiting ring 11 may be positioned.

Mounted for reciprocation within the cylinder 1 is a plunger or piston 12 which is provided with an internal chamber 13 and an open end 14. The open end may be closed by a valve 15 which is positioned within a cage 16 mounted on the reduced portion 17 of the plunger. A spring 18 is positioned within the cylinder 1 and bears at one end against the bottom of the cylinder and at the other end against a shoulder 19 formed adjacent the reduced portion 17 of the plunger 12. A spring 20 may be positioned within the cage 16 and may be biased to move the valve 15 to seating position against the outer end of the reduced portion 17. In some installations, the spring 20 may be omitted and there will be no spring effective to move the valve 15 to the seating position. In that case, the movement of the valve will be determined by pressure conditions within the tappet or by inertia, or both.

At its upper end, the plunger 12 is internally enlarged as at 21 to provide a shoulder 22. A plug 23 is seated and fixed within the portion 21. As shown, the plug is provided with a rounded cup shaped depression 24, within which the rounded end of a hollow pushrod may be seated. The member 23 is also provided with a passage 25, by means of which oil may move from the chamber 13 to the cup 24 for movement to the pushrod. The member 23 is provided with a generally flat face 26 against which the metering disk may be seated.

The disk itself is shown in detail in FIGURES 2 and 3 and is shown only generally in FIGURE 1. The disk comprises a generally flat member 27 which is circular in plan, as shown in FIGURES 2 and 3, and is of less diameter than the portion 21 of the plunger so that oil may pass around the edges of the disk in its movement to the passage 25.

On each face of the disk is a raised portion of generally spiral plan. There is thus a raised portion 28 shaped on one face of the disk and a raised portion 29 shaped on the opposite face. It is important to notice that the ends 30 and 31 of the spiral 28 are out of contact with each other and overlap each other. Thus, the spiral 28 extends about more than a circle. Similarly, the ends 32 and 33 of the spiral 29 overlap each other and are out of contact with each other. Thus, each of the spirals provides a metering passage between its ends. Each of these passages is effective when one of the spirals is seated against the surface 26. There is thus a metering opening between the ends 30 and 31 and another metering opening on the opposite face of the disk between the ends 32 and 33. Since only one of the spirals is seated on the seat 26 at a given time, only one of the metering openings is effective at a time.

The two spirals are provided merely as an aid in assembly. Experience has shown that in assembly, if only one spiral were provided on one face of the disk, an operator might carelessly position the disk so that the spiral faced the chamber 13. In that case, it could never seat upon the seat 26 and no metering effect would occur. Where two spirals are provided, one on each face of the disk, it is immaterial how the disk is assembled since one spiral will always be in position facing the seat 26 and adapted to seat upon it.

In the modified from of FIGURE 4, the metering spiral, instead of being formed on the disk 27, is formed in the bottom surface 26 of the cup 24 and comprises a raised member 34 of spiral plan having two overlapping ends 35 and 36 between which a metering gap or opening 37 is defined. With the modified cup member of FIGURE 4, a flat valve disk 38 is used.

The use and operation of the invention are as follows:

The metering disk, as shown in the figures, is assembled in a tappet. One of the spirals, whichever is faced toward the seat 26, may seat against it when conditions within the tappet move the disk against the seat 26. The other times, the disk may rest upon the shoulder 22 which merely limits its movement away from the seat 26. When conditions within the tappet move the disk from the position of FIGURE 1 so that the spiral 28, for example, is seated against the seat 26, the spiral 28 acts as a metering valve. When the disk is in that position, with the spiral 28 seated against the face 26, the distance or space between the ends 30 and 31 of the spiral constitutes the metering opening through which oil, after having passed about the edge of the disk, may move into the passage 25 for the discharge from the plunger.

The modified form illustrated in FIGURES 4 and 5 operates generally the same as the form of FIGURES 1, 2 and 3. The disk 38 is positioned between the shoulder 22 and the surface 26. When pressure conditions within the plunger cause the disk to be moved away from the shoulder 22 and to contact the raised spiral 34 and to be seated against it, flow through the passage 25 is metered by the opening 37 between the adjacent ends of the spiral 34. Thus flow of liquid from within the cylinder outwardly through the passage 25 is restricted and is metered by the area of the passage 37 which can, of course, be designed of any predetermined capacity to suit the requirements of an individual engine.

I claim:
1. In combination in a hydraulic tappet,
a hollow cylinder,
a hollow plunger mounted therein for reciprocation,
a member closing said plunger and shaped with an outlet passage therethrough,
a seat about said passage,
means for supplying oil to the interior of said plunger and a metering valve positioned within said plunger and provided with a raised portion of generally spiral form,
the ends of said spiral being positioned away from each other and overlapping each other in plan,
said disk being adapted to be moved to seat against said seat, about said outlet opening.

2. The combination of claim 1 characterized by the fact that said disk is provided on each face with a raised portion of generally spiral plan.

3. The combination of claim 1 characterized by the fact that means are provided for limiting movement of the disk away from the seat.

4. The combination of claim 2 characterized by the fact that means are provided for limiting the movement of the disk away from the seat.

5. In combination in a metering valve assembly within a hollow plunger in a hydraulic tappet, said plunger having an outlet opening,
a metering valve assembly comprising a seat member about said opening,
and a disc member movably mounted adjacent said outlet opening,
one of said members shaped to provide a raised spiral formed with overlapping ends out of contact with each other.

6. The combination of claim 5 characterized by the fact that said spiral is on said seat member.

7. The combination of claim 6 characterized by the fact that means are provided for limiting movement of said disc away from said seat member.

References Cited

UNITED STATES PATENTS

| | | | |
|---|---|---|---|
| 1,899,251 | 2/1933 | Zerk | 138—42 X |
| 2,185,991 | 1/1940 | Voorhies et al. | |
| 2,818,050 | 12/1957 | Papenguth. | |
| 3,128,749 | 4/1964 | Dadd. | |
| 3,273,547 | 9/1966 | Lesher. | |

AL LAWRENCE SMITH, *Primary Examiner.*

U.S. Cl. X.R.

138—42; 184—6